United States Patent
Wang et al.

(10) Patent No.: US 9,904,577 B2
(45) Date of Patent: Feb. 27, 2018

(54) HYBRID HETEROGENEOUS HOST SYSTEM, RESOURCE CONFIGURATION METHOD AND TASK SCHEDULING METHOD

(71) Applicant: Inspur (Beijing) Electronic Information Industry Co., Ltd, Beijing (CN)

(72) Inventors: Endong Wang, Beijing (CN); Leijun Hu, Beijing (CN); Rengang Li, Beijing (CN)

(73) Assignee: INSPUR (BEIJING) ELECTRONIC INFORMATION INDUSTRY CO., LTD, Beijing (CN)

( * ) Notice: Subject to any disclaimer, the term of this patent is extended or adjusted under 35 U.S.C. 154(b) by 175 days.

(21) Appl. No.: 14/895,295

(22) PCT Filed: Jan. 16, 2015

(86) PCT No.: PCT/CN2015/070841
§ 371 (c)(1),
(2) Date: Dec. 2, 2015

(87) PCT Pub. No.: WO2016/082320
PCT Pub. Date: Jun. 2, 2016

(65) Prior Publication Data
US 2016/0378548 A1  Dec. 29, 2016

(30) Foreign Application Priority Data
Nov. 26, 2014  (CN) .......................... 2014 1 0704773

(51) Int. Cl.
*G06F 13/00*    (2006.01)
*G06F 9/48*     (2006.01)
(Continued)

(52) U.S. Cl.
CPC .............. *G06F 9/4881* (2013.01); *G06F 9/48* (2013.01); *G06F 9/5022* (2013.01); *G06F 13/12* (2013.01);
(Continued)

(58) Field of Classification Search
None
See application file for complete search history.

(56) References Cited

U.S. PATENT DOCUMENTS

| | | | |
|---|---|---|---|
| 6,526,481 B1* | 2/2003 | Shen .................. | G06F 12/0817 709/215 |
| 7,584,330 B2* | 9/2009 | McKinney .......... | G06F 12/0813 711/144 |

(Continued)

FOREIGN PATENT DOCUMENTS

| | | |
|---|---|---|
| CN | 102508712 | 6/2012 |
| CN | 102541804 | 7/2012 |

(Continued)

*Primary Examiner* — Henry Tsai
*Assistant Examiner* — Aurangzeb Hassan
(74) *Attorney, Agent, or Firm* — Pearl Cohen Zedek Latzer Baratz LLP

(57) ABSTRACT

A hybrid heterogeneous host system, a resource configuration method and a task scheduling method are disclosed. The system includes: a basic unit, including: computing resource nodes, storage resource nodes and input/output I/O resource nodes; wherein multiple basic units are connected via a high-speed internetwork; and a software definition unit, configured to: when system resources are increased or reduced, extend the address space of an increased hardware resource to a current address space, or delete an address space of a reduced hardware resource from the current address space, and update a system resource view. Through the embodiments of the present invention, the extendibility of a tightly coupled shared memory system can be guaranteed, and the design complexity and cost of the multiway system also can be greatly reduced, which improves the flexibility and reusability of the system.

18 Claims, 2 Drawing Sheets

(51) Int. Cl.
*G06F 9/50* (2006.01)
*G06F 13/12* (2006.01)
*G06F 13/40* (2006.01)

(52) U.S. Cl.
CPC ........ *G06F 13/4068* (2013.01); *G06F 13/409* (2013.01); *G06F 13/4045* (2013.01); *G06F 13/4081* (2013.01)

(56) References Cited

U.S. PATENT DOCUMENTS

| | | | | |
|---|---|---|---|---|
| 2003/0110360 | A1* | 6/2003 | Nakajima | G06F 12/0831 711/152 |
| 2004/0236891 | A1* | 11/2004 | Arimilli | G06F 15/17337 710/306 |
| 2011/0238946 | A1* | 9/2011 | Rajamony | G06F 12/0207 711/203 |
| 2013/0227328 | A1* | 8/2013 | Ishii | G06F 1/12 713/375 |
| 2016/0283304 | A1* | 9/2016 | Horikawa | G06F 11/3409 |

FOREIGN PATENT DOCUMENTS

| | | |
|---|---|---|
| CN | 102750602 | 10/2012 |
| WO | WO 2012/093498 | 7/2012 |

* cited by examiner

US 9,904,577 B2

HYBRID HETEROGENEOUS HOST SYSTEM, RESOURCE CONFIGURATION METHOD AND TASK SCHEDULING METHOD

CROSS-REFERENCE TO RELATED APPLICATIONS

This application is a National Phase Application of PCT International Application No. PCT/CN2015/070841, International Filing Date Jan. 16, 2015, claiming priority of Chinese Patent Application No. 201410704773.8, filed Nov. 26, 2014, all of which are incorporated herein by reference in their entirety.

TECHNICAL FIELD

The present invention relates to the field of computer, and specifically, to a hybrid heterogeneous host system, a resource allocation method and a task scheduling method.

BACKGROUND OF THE RELATED ART

With the rapid development of the computer technology, in order to meet demands of social and economic development, a high-performance computer system becomes one of the bottlenecks which restrict the society to develop key fields. The key fields such as finance and telecom, etc. have extremely high requirements on the performance of the computer system, thus it is required to construct a huge multiway computer system, so as to better adapt to the current application requirements of various fields, but it also gets into a flexibility problem of the multiway computer system extension on the other hand, which requires implementing the integration of computing nodes of various structures, and guarantees the application performance of the system, thereby implementing a flexible and high extendibility of the system.

SUMMARY OF THE INVENTION

The technical problem required to be solved by the present invention is how to guarantee the extendibility of a tightly coupled shared memory system, greatly reduce the design complexity and cost of the multiway system in the meantime, and improve the flexibility and reusability of the system.

In order to achieve the above object, the following technical scheme is adopted.

A hybrid heterogeneous host system comprises: a basic unit and a software definition unit; wherein, the basic unit comprises: computing resource nodes, storage resource nodes and input/output I/O resource nodes; a plurality of the basic units are connected via a high-speed internetwork; and the software definition unit is configured to: when system resources are increased or reduced, extend an address space of an increased hardware resource to a current address space, or delete an address space of a reduced hardware resource from a current address space, and update a system resource view.

Alternatively, the basic unit further comprises: a protocol processing chip, and the protocol processing chip is configured to: perform cache consistency protocol maintenance, and an interconnection is implemented between the protocol processing chips by means of optical interconnection.

Alternatively, the computing resource nodes refer to computing resource nodes of various processor scales, comprising: a 1-way processor, a 2-way processor, a 4-way processor and an 8-way processor.

Alternatively, the software definition unit comprises: an application interface subunit, a resource management subunit and a scheduling management subunit, wherein:

the application interface subunit comprises an application management module, and the application management module is configured to: when an extension is performed on system hardware resources comprising computing resources, storage resources and I/O resources, by means of software configuration, and by adjusting a system hardware resource map, adjust configuration of the system hardware resources;

the resource management subunit comprises: a system resource configuration module and a system resource management module;

the system resource configuration module is configured to: perform re-integration on the system hardware resources according to the configuration of the system hardware resources; and the system resource management module is configured to: feed back integration configuration information of the system hardware resources to the scheduling management subunit and the application interface subunit.

Alternatively, the system resource management module is further configured to: construct a system hardware resource management directory, and define the system hardware resource management directory according to a required maximum scale of host system;

the system resource configuration module is further configured to: extend the system hardware resource management directory by using a reserved extension mode or a continuous extension mode; and feed back the new system hardware resource management directory obtained through extension to the scheduling management subunit;

wherein, the reserved extension mode refers to: inserting a reserved address space in a system address space, and when the system extends a node identical with an original computing node, obtaining a new system resource directory by means of inserting an address of the node identical with the original computing node in the reserved address space; and the continuous extension mode refers to: when the system extends a new computing node, obtaining a new system resource directory by means of continuous extension for the system address space.

Alternatively, the scheduling management subunit comprises a task scheduling allocation module, and the task scheduling allocation module is configured to: receive resource map information of a bottom hardware resource management layer, before a computation task is executed, determine a required hardware resource scale according to characteristics and computation requirements of the computation task, and schedule and allocate to execute hardware resources of the computation task according to a determined result.

Alternatively, the task scheduling allocation module is further configured to: receive the obtained new system hardware resource management directory fed back by the system resource configuration module, and perform scheduling on the computation task according to system hardware resource configuration information in the new system hardware resource management directory, so as to allocate a new computation task to adjacent computing resource nodes;

the application management module is further configured to: when the system reduces resources, shift a computation task of a computing resource node required to be reduced to other nodes; and the system resource management module is further configured to: after the application management module shifts the task of the computing resource node required to be reduced to other nodes, form a reserved address space or delete an address mapping directory, and feed back information of a formed reserved address space or a deleted address mapping directory to the application management module.

A resource configuration method based on the above system comprises:

when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

Alternatively, the resource configuration method further comprises:

the software definition unit constructing a system hardware resource management directory, and defining the system hardware resource management directory according to a required maximum scale of host system, extending the system hardware resource management directory by using a reserved extension mode or a continuous extension mode, and obtaining the new system hardware resource management directory obtained through extension.

Alternatively, the reserved extension mode refers to: inserting a reserved address space in a system address space, and when the system extends a node identical with an original computing node, obtaining a new system resource directory by means of inserting an address of the node identical with the original computing node in the reserved address space; and the continuous extension mode refers to: when the system extends a new computing node, obtaining a new system resource directory by means of continuous extension for the system address space.

A task scheduling method based on the above system comprises:

a software definition unit receiving resource map information of a bottom hardware resource management unit, before a computation task is executed, determining a required hardware resource scale according to characteristics and computation requirements of the computation task, and scheduling and allocating to execute hardware resources of the computation task according to a determined result.

Alternatively, the task scheduling method further comprises:

after extending a system hardware resource management directory, the software definition unit obtaining a new system hardware resource management directory; and performing scheduling on the computation task according to system hardware resource configuration information in the new system hardware resource management directory, so as to allocate a new computation task to adjacent computing resource nodes.

Alternatively, the task scheduling method further comprises:

when the system reduces resources, the software definition unit shifting a computation task of a computing resource node required to be reduced to other nodes, and forming a reserved address space or deleting an address mapping directory.

Compared with the related art, through the scheme of the embodiments of the present invention, the extendibility of the tightly coupled shared memory system can be guaranteed, and the design complexity and cost of the multiway system also can be greatly reduced, which improves the flexibility and reusability of the system.

BRIEF DESCRIPTION OF DRAWINGS

The accompanying drawings in the embodiments of the present invention will be described below, the accompanying drawings in the embodiments are used to provide a further understanding of the present invention, and explain the present invention together with the specifications, but do not constitute a limitation on the protection scope of the present invention.

PREFERRED EMBODIMENTS OF THE INVENTION

The present invention will be further described in combination with the accompanying drawings below, which cannot be used to limit the protection scope of the present invention.

In the design method of the software definition based hybrid heterogeneous host system architecture of the embodiment of the present invention, a limitation of high extendibility of the multiprocessor system is mainly considered, and various computing resource nodes and storage resource nodes are used as basic units, and the basic units are interconnected via a high-speed internetwork, and a system cache consistency is maintained, and a large-scale tightly coupled heterogeneous multiprocessor system is constructed, and a dynamic extension (increase or reduction) of the system resources is implemented by means of software definition, thereby achieving a flexible and high extendibility of the system. The software-defined design method includes the management and configuration of system resources and the management and scheduling of system tasks.

Figure 1:
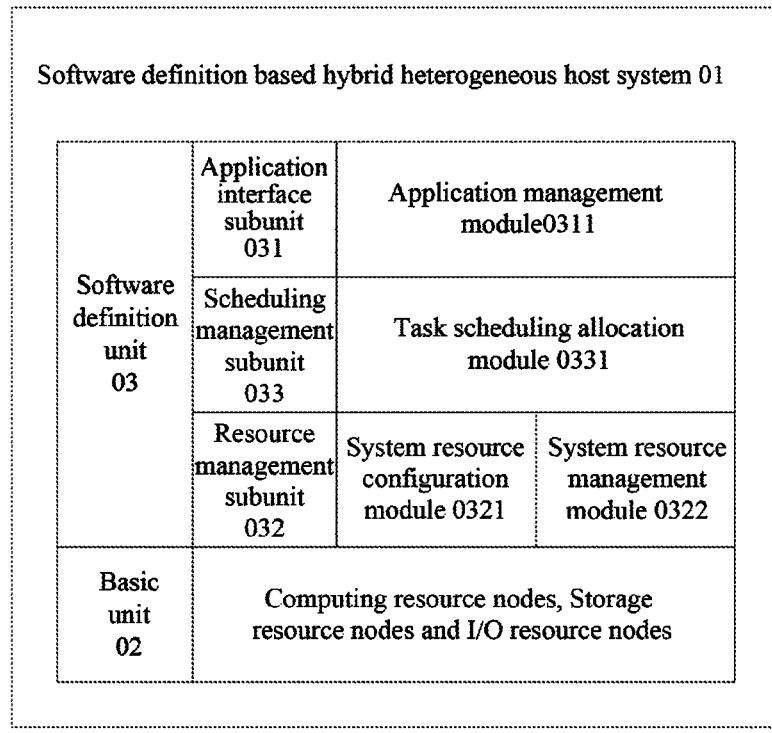
FIG. 1 is a block diagram of a hybrid heterogeneous host system according to the embodiment of the present invention.

Specifically, the embodiment of the present invention provides a hybrid heterogeneous host system 01, and as shown in FIG. 1, the system includes: a basic unit 02 and a software definition unit 02.

The basic unit 02 includes: computing resource nodes, storage resource nodes and input/output I/O resource nodes; multiple basic units are connected via the high-speed internetwork.

The software definition unit 03 is configured to: when system resources are increased or reduced, extend an address space of an increased hardware resource to a current address space, or delete an address space of a reduced hardware resource from the current address space, and update a system resource view, and feed back the updated system resource view to a software scheduling and application layer of the upper layer.

Wherein, the computing resource nodes are the set of various processor units, such as a PCB board of a 1-way processor, a PCB board of a 2-way processor, a PCB board of a 4-way processor and a PCB board of an 8-way processor.

Wherein, the storage resource nodes refer to system memories and storage resources, and the system memories are distributed at various computing resource nodes, and they are globally shared, and storage devices also can be connected to the system, just as the computing resource nodes are connected to the high-speed internetwork.

The input/output I/O resource nodes are IO resources of the system, such as an HBA card, a PCI card device and a network card and so on.

Alternatively, the basic unit 02 also includes a protocol processing chip, and the protocol processing chip is used for performing the cache consistency protocol maintenance, and a high-speed interconnection is implemented between protocol processing chips by means of optical interconnection.

The characteristics of the high-speed internetwork for the cache consistency protocol maintenance mainly refer to implementing a high-speed interconnection between the nodes by means of chips or modules, and this is raised according to the technical characteristics of tight coupling of the host system and requirements of high performance of the system, and cache consistency protocol chips are adopted to guarantee the system cache consistency.

Alternatively, the computing resource nodes refer to computing resource nodes of various processor scales, comprising: a 1-way processor, a 2-way processor, a 4-way processor and an 8-way processor.

Figure 2:
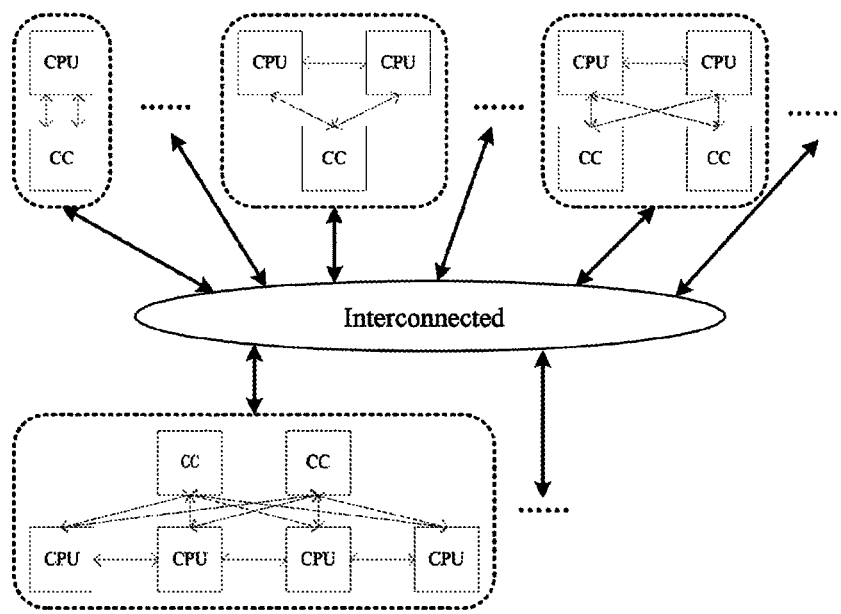
FIG. 2 is a structure chart of various computing resource nodes in the hybrid heterogeneous host system according to the embodiment of the present invention.

The computing resource units in the hybrid heterogeneous host system mainly refer to a computing resource set constructed based on a heterogeneous computing unit according to the structure characteristics of the host system and the requirements of the scale extension; and computing resource nodes of various processor scales (1 way, 2 ways, 4 ways and 8ways) can be assembled in the hybrid heterogeneous host system architecture, thus the flexibility of the system extension can be greatly enhanced. The computing resource nodes in the hybrid heterogeneous host system may refer to FIG. 2, wherein computing resource nodes of 4 kinds of processor scales are shown, which includes: a computing resource node with one CPU and one Collaborative chipset (CC), a computing resource node with two CPUs and one CC, a computing resource node with two CPUs and two CCs, and a computing resource node with four CPUs and two CCs; and these computing resource nodes are Inter Connected.

Alternatively, the software definition unit 03 includes: an application interface subunit 031, a resource management subunit 032 and a scheduling management subunit 033.

The application interface subunit 031 includes an application management module 0311, and the application management module 0311 is configured to: when the extension is performed on system hardware resources including computing resources, storage resources and I/O resources, by means of software configuration, and by dynamically adjusting a system hardware resource map, dynamically adjust the configuration of the system hardware resources;

the resource management subunit 032 includes: a system resource configuration module 0321 and a system resource management module 0322;

the system resource configuration module 0321 is configured to: perform re-integration on the system hardware resources according to the configuration of the system hardware resources;

and the system resource management module 0322 is configured to: feed back integration configuration information of the system hardware resources to the scheduling management subunit and the application interface subunit.

Alternatively, the system resource management module 0322 is also used to: construct a system hardware resource management directory, and define the system hardware resource management directory according to a required maximum scale of host system.

The system hardware resource management directory is an overall view of the system hardware resource address space, and it is managed and maintained by a resource management unit between the bottom hardware and the upper software, and it is configurable.

The system resource configuration module 0321 is also used to: extend the system hardware resource management directory by using a reserved extension mode or a continuous extension mode; and feed back a new system hardware resource management directory obtained through extension to the scheduling management subunit 033.

Wherein, the reserved extension mode refers to: inserting a reserved address space in a system address space, and when the system extends a node identical with an original computing node, obtaining a new system resource directory by means of inserting an address of the node identical with the original computing node in the reserved address space; and the continuous extension mode refers to: when the system extends a new computing node, obtaining a new system resource directory by means of continuous extension for the system address space.

Alternatively, the scheduling management subunit 033 includes a task scheduling allocation module 0331, which is used to: receive resource map information of a bottom hardware resource management layer, before a computation task is executed, determine a required hardware resource scale according to characteristics and computation requirements of the computation task, and schedule and allocate to execute hardware resources of the computation task according to a determined result.

Here it can be determined through developed application software, and the application software is required to analyze the characteristics and computation requirements of the computation task to obtain the required hardware resource scale, for example, how many memory resources are required, and how many processor cores are required and so on.

Alternatively, the task scheduling allocation module 0331 is also used to: receive the obtained new system hardware resource management directory fed back by the system resource configuration module 0321, and perform scheduling on the computation task according to system hardware resource configuration information in the new system hardware resource management directory, so as to allocate a new computation task to adjacent computing resource nodes.

The adjacent computing resource nodes refer to computing resource nodes whose transmission path is shorter than a preset threshold value, and they can be but not limited to referring to processors within the same computing node, and they can be newly added computing resource nodes; if the demand for computing resources is greater, they also can be processors of different computing nodes, but different computing resource nodes should also be mutually adjacent, so as to reduce access delay across nodes, and enhance the overall performance.

The application management module 0311 is also used to: when the system reduces resources, shift a computation task of a computing resource node required to be reduced to other nodes.

The system resource management module 0322 is also used to: after the application management module 0311 shifts the task of the computing resource node required to be reduced to other nodes, form a reserved address space or delete an address mapping directory, and feed back information of a formed reserved address space or a deleted address mapping directory to the application management module 0311.

In such design of the computer system architecture, with the software defined method, the flexible extension of the multiprocessor system is implemented, and the heterogeneous host system architecture is constructed, the global memory sharing is effectively implemented, the system transmission bandwidth and delay are balanced, and the flexibility of software defining effectively solves the flexible extension problem of the multiprocessor system, which has a very high technological value.

One of the key technologies of designing a highly extensible multiway computer system is how to implement heterogeneous integration of the system resources, and improve the flexibility and efficiency of the system extension.

The embodiment of the present invention also provides a resource configuration method based on the above system, and the method includes:

when the extension is performed on system hardware resources comprising computing resources, storage resources and input/output I/O resources, a software definition unit adjusting the configuration of the system hardware resources by means of software configuration and by means of adjusting a system hardware resource map, and performing re-integration on the system hardware resources according to the configuration, and obtaining integration configuration information of the system hardware resources.

Alternatively, the method also includes the following steps:

the software definition unit constructing a system hardware resource management directory, and defining the system hardware resource management directory according to a required maximum scale of host system, extending the system hardware resource management directory by using a reserved extension mode or a continuous extension mode, and obtaining the new system hardware resource management directory obtained through extension.

Figure 3:
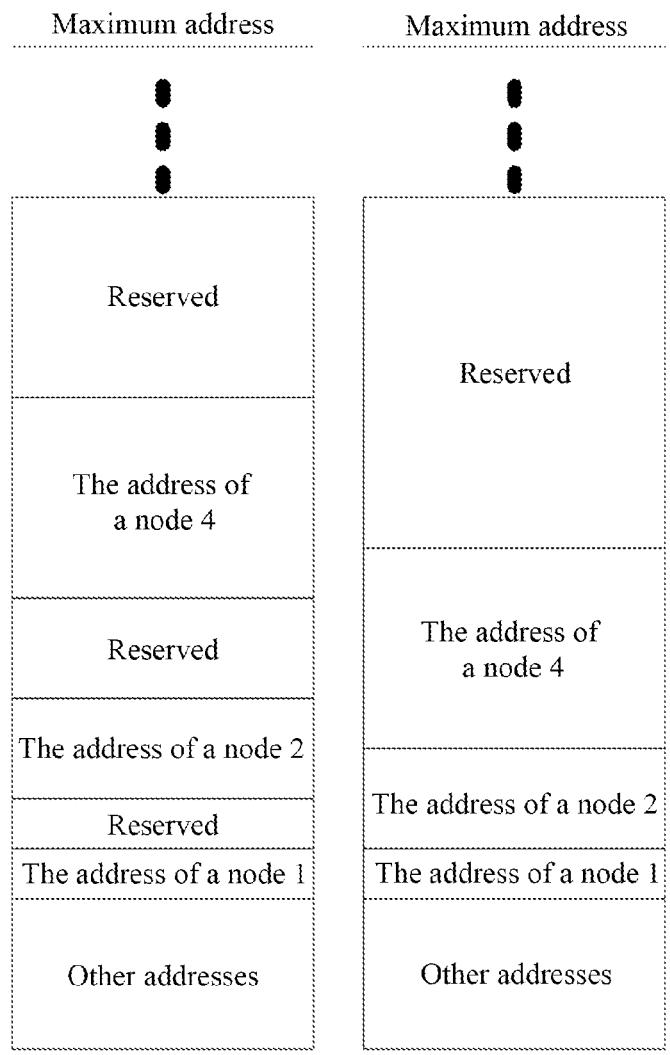
FIG. 3 is an address mapping diagram of the hybrid heterogeneous host system according to the embodiment of the present invention.

Wherein, the resource management directory is not infinitely extended (it has a directory upper limit), therefore, it is required to define a system resource directory according to the required maximum scale of host system, and extend the resource management directory by using the reserved extension mode or the continuous extension mode. No matter which extension mode is used, when the system resource directory reaches an upper limit of address space of the host system, the system extension cannot be continued. An address mapping diagram of the method is as shown in FIG. 3, the address space includes Reserved spaces, addresses of Nodes (such as addresses of nodes 1, 2 and 4 in the FIG. 3) and other addresses.

Alternatively, the reserved extension mode refers to: inserting a reserved address space in a system address space, and when the system extends a node identical with an original computing node, obtaining a new system resource directory by means of inserting an address of the node identical with the original computing node in the reserved address space.

The continuous extension mode refers to: when the system extends a new computing node, obtaining a new system resource directory by means of continuous extension for the system address space.

The embodiment of the present invention also provides a task scheduling method based on the above system, and the method includes:

a software definition unit receiving resource map information of a bottom hardware resource management unit, and before a computation task is executed, determining a required hardware resource scale according to characteristics and computation requirements of the computation task, and scheduling and allocating to execute hardware resources of the computation task according to a determined result.

Alternatively, the method also includes the following steps:

after extending a system hardware resource management directory, the software definition unit obtaining a new system hardware resource management directory; and performing scheduling on the computation task according to system hardware resource configuration information in the new system hardware resource management directory, so as to allocate a new computation task to adjacent computing resource nodes.

Alternatively, the method also includes:

when the system reduces resources, the software definition unit shifting a computation task of a computing resource node required to be reduced to other nodes, and forming a reserved address space or deleting an address mapping directory.

The software definition based hybrid heterogeneous host system architecture guarantees the extendibility of the tightly coupled shared memory system, and the heterogeneous structure characteristic also greatly reduces the design complexity and cost of the multiway system, which improves the flexibility and reusability of the design.

It should be noted that the above embodiments are only for the people skilled in the art to have an easier understanding, which is not used to limit the protection scope of the present invention, and in the premise of not departing from the inventive concept of the present invention, all apparent substitutions and improvements of the present invention made by the people skilled in the art are within the protection scope of the present invention.

INDUSTRIAL APPLICABILITY

Through the scheme of the present invention, the extendibility of the tightly coupled shared memory system can be guaranteed, and the design complexity and cost of the multiway system also can be greatly reduced, which improves the flexibility and reusability of the system. Therefore, the present invention has a very strong industrial applicability.

What is claimed is:

1. A hybrid heterogeneous host system, comprising: a basic unit and a software definition unit; wherein,
the basic unit comprises: computing resource nodes, storage resource nodes and input/output I/O resource nodes; a plurality of the basic units are connected via a high-speed internetwork;
the software definition unit is configured to: when system resources are increased or reduced, extend an address space of an increased hardware resource to a current address space, or delete an address space of a reduced hardware resource from a current address space, and update a system resource view; wherein, the software definition unit comprises: an application interface subunit, a resource management subunit and a scheduling management subunit, wherein:

the application interface subunit comprises an application management module, and the application management module is configured to: when an extension is performed on system hardware resources comprising computing resources, storage resources and I/O resources, by means of software configuration, and by adjusting a system hardware resource map, adjust configuration of the system hardware resources;

the resource management subunit comprises: a system resource configuration module and a system resource management module;

the system resource configuration module is configured to: perform re-integration on the system hardware resources according to the configuration of the system hardware resources; and the system resource management module is configured to: feed back integration configuration information of the system hardware resources to the scheduling management subunit and the application interface subunit.

2. The hybrid heterogeneous host system according to claim 1, wherein, the basic unit further comprises: a protocol processing chip, and the protocol processing chip is configured to: perform cache consistency protocol maintenance, and an interconnection is implemented between the protocol processing chips by means of optical interconnection.

3. The hybrid heterogeneous host system according to claim 1, wherein, the computing resource nodes refer to computing resource nodes of various processor scales, comprising: a 1-way processor, a 2-way processor, a 4-way processor and an 8-way processor.

4. The hybrid heterogeneous host system according to claim 1, wherein,
the system resource management module is further configured to: construct a system hardware resource management directory, and define the system hardware resource management directory according to a required maximum scale of host system;
the system resource configuration module is further configured to: extend the system hardware resource management directory by using a reserved extension mode or a continuous extension mode; and feed back a new system hardware resource management directory obtained through extension to the scheduling management subunit;
wherein, the reserved extension mode refers to: inserting a reserved address space in a system address space, and when a system extends a node identical with an original computing node, obtaining a new system resource directory by means of inserting an address of the node identical with the original computing node in the reserved address space; and
the continuous extension mode refers to: when the system extends a new computing node, obtaining a new system resource directory by means of continuous extension for the system address space.

5. The system according to claim 1, wherein, the scheduling management subunit comprises a task scheduling allocation module, and the task scheduling allocation module is configured to: receive resource map information of a bottom hardware resource management layer, before a computation task is executed, determine a required hardware resource scale according to characteristics and computation requirements of the computation task, and schedule and allocate to execute hardware resources of the computation task according to a determined result.

6. The system according to claim 5, wherein,
the task scheduling allocation module is further configured to: receive an obtained new system hardware resource management directory fed back by the system resource configuration module, and perform scheduling on the computation task according to system hardware resource configuration information in the new system hardware resource management directory, so as to allocate a new computation task to adjacent computing resource nodes;
the application management module is further configured to: when a system reduces resources, shift a computation task of the computing resource node required to be reduced to other nodes;
the system resource management module is further configured to: after the application management module shifts a task of the computing resource node required to be reduced to other nodes, form a reserved address space or delete an address mapping directory, and feed back information of the formed reserved address space or the deleted address mapping directory to the application management module.

7. A resource configuration method based on the system according to claim 1, comprising:
when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

8. The resource configuration method according to claim 7, further comprising:
the software definition unit constructing a system hardware resource management directory, and defining the system hardware resource management directory according to a required maximum scale of host system, extending the system hardware resource management directory by using a reserved extension mode or a continuous extension mode, and obtaining a new system hardware resource management directory obtained through extension.

9. The resource configuration method according to claim 8, wherein,
the reserved extension mode refers to: inserting a reserved address space in a system address space, and when a system extends a node identical with an original computing node, obtaining a new system resource directory by means of inserting an address of the node identical with the original computing node in the reserved address space;
the continuous extension mode refers to: when the system extends a new computing node, obtaining a new system resource directory by means of continuous extension for the system address space.

10. A task scheduling method based on the system according to-claim 1, comprising:
a software definition unit receiving resource map information of a bottom hardware resource management unit, before a computation task is executed, determining a required hardware resource scale according to characteristics and computation requirements of the computation task, and scheduling and allocating to execute hardware resources of the computation task according to a determined result.

11. The task scheduling method according to claim 10, further comprising:
after extending a system hardware resource management directory, the software definition unit obtaining a new system hardware resource management directory; and performing scheduling on the computation task according to system hardware resource configuration information in the new system hardware resource management directory, so as to allocate a new computation task to adjacent computing resource nodes.

12. The task scheduling method according to claim 11, further comprising:
when a system reduces resources, the software definition unit shifting a computation task of the computing resource node required to be reduced to other nodes, and forming a reserved address space or deleting an address mapping directory.

13. A resource configuration method based on the system according to claim 2, comprising:
when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

14. A resource configuration method based on the system according to claim 3, comprising:
when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

15. A resource configuration method based on the system according to claim 4, comprising:
when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

16. A resource configuration method based on the system according to claim 5, comprising:
when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

17. A resource configuration method based on the system according to claim 6, comprising:
when an extension is performed on system hardware resources comprising computing resources, storage resources and input/output I/O resources, a software definition unit adjusting configuration of the system hardware resources by means of software configuration and by means of adjusting a system hardware resource map, and performing re-integration on the system hardware resources according to the configuration, and obtaining integration configuration information of the system hardware resources.

18. A task scheduling method based on the system according to claim 2, comprising:
a software definition unit receiving resource map information of a bottom hardware resource management unit, before a computation task is executed, determining a required hardware resource scale according to characteristics and computation requirements of the computation task, and scheduling and allocating to execute hardware resources of the computation task according to a determined result.

* * * * *